3,578,553
NITROGEN DIOXIDE PULPING PROCESS
Madhu P. Godsay and Donald M. MacDonald, Hawkesbury, Ontario, Canada, assignors to Canadian International Paper Company, Montreal, Quebec, Canada
Filed Sept. 10, 1968, Ser. No. 758,841
Int. Cl. D27c 3/16
U.S. Cl. 162—14                                    9 Claims

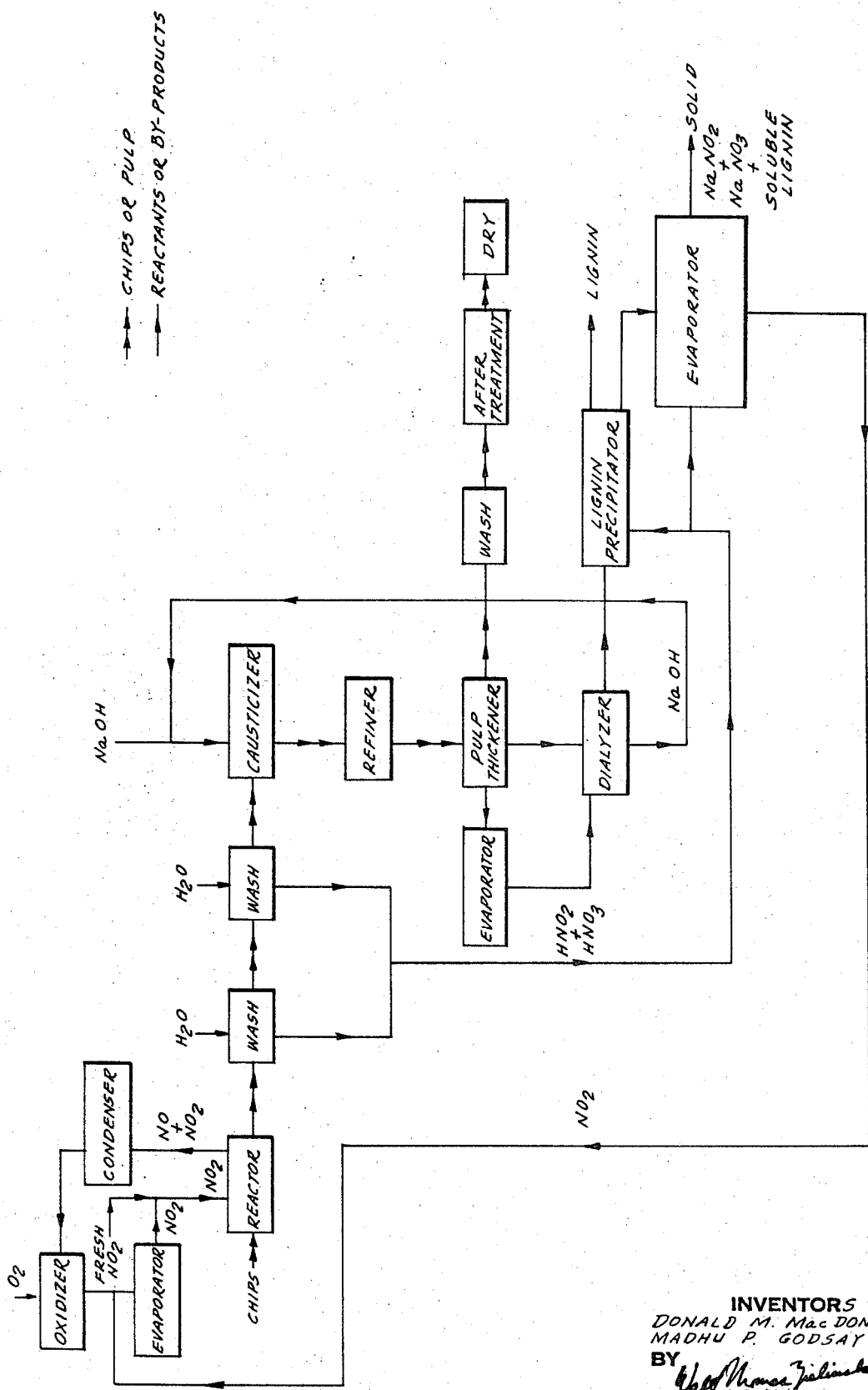

ABSTRACT OF THE DISCLOSURE

A primary pulping process in which raw ligno-cellulosic material is contacted with nitrogen dioxide gas at atmospheric pressure and ambient temperature to produce cellulosic pulp and useful by-products, for example lignin nitrates and nitrites, without air or other pollution.

---

This invention comprises a new method of separating the cellulosic fiber component of raw vegetable matter from the interfiber bonding material, lignin. More particularly, the invention comprises the use of gaseous nitrogen dioxide as a primary pulping agent to treat wood or any other ligno-cellulosic material in any convenient form, as chips, wafers, slivers, sawdust, shavings, chopped straw, etc. The term nitrogen dioxide, hereinafter referred to as $NO_2$, refers to the equilibrium state of nitrogen dioxide with dinitrogen tetroxide according to the chemical equation:

$$2NO_2 \rightleftharpoons N_2O_4$$

In addition, other non-cellulosic components, such as glucomannans, xylans and plant resins, can be removed, either partly or completely, whichever is desired. Lignin removal can also be complete, or only to a degree sufficient to allow separation of the fibers.

The principal object of the present invention is a simple, low cost primary pulping process which operates without pressure or provision of external heat in a very short time.

In accordance with the present invention, $NO_2$ can be used in the pure state, or diluted with gases such as air, NO, $N_2O_3$, $CO_2$, nitrogen, or oxygen. However, high concentrations of $NO_2$ are required to achieve the objects of this invention and dilution is usually accidental, such as dilution with by-product NO or $N_2O_3$, or by air not swept from the reactor. Dilution with water is, preferably, also avoided by utilizing what is commonly termed a vapor phase process, which avoids submergence of the material treated.

In the case of ordinary mill wood chips, the time of contact with undiluted $NO_2$ vapor need be only 10 minutes to obtain a yield of 80% of fibers. These fibers still contain most of the glucomannans and xylans and some lignin and are useful where color is not an important criterion. Increasing the time of contact results in increasingly pure pulp until, at times between 60 and 90 minutes, a quite pure cellulose is obtained at a yield of 35 to 40%. This cellulose contains only about 5% of mixed glucomannans and xylans, 0.3% lignin, and 0.1% resin. Still longer contact times cause a progressive degradation of the cellulose itself. After four hours, all of the original wood chips become soluble in a dilute caustic solution.

The cellulose source can be standard wood chips used in a pulp or paper mill, although shavings, wafers, sawdust, etc., are also suitable.

The reactions normally are started at a temperature of about 23° C. to 25° C. and the reactor is cooled with water as the reaction is decidedly exothermic. Starting temperatures below about 23° C. are avoided to prevent condensation of $NO_2$ (boiling point 21.2° C.) which would lead to an uneven reaction. Final temperatures have ranged from 32° C. to 82° C. with the higher temperature being developed in one 90 minute run with inefficient cooling. High temperatures are, however, undesirable, because the rate of the chemical reactions becomes excessively fast compared to the rate of $NO_2$ diffusion into the chips as shown by increased screenings and decreased screened yield. Efficient cooling is accordingly beneficial and the final temperature should be as close as possible to the starting temperature to ensure both uniform reaction of all chips and efficient process control (i.e., that the reaction can be stopped at the desired yield level).

At the end of the $NO_2$ contact time, the reactor is purged with air. The purged $NO_2$ may be recovered with conventional condensers and any by-products, such as nitric oxide, NO, can be reoxidized to $NO_2$ in a separate reactor.

After purging with air, the chips are washed with water to remove excess by-product nitrogen acids and treated with dilute bases, such as sodium or ammonium hydroxides or alkaline salts. The base concentration is such that almost all is neutralized by the nitrogen acids remaining in the chips. This causes minimal loss of glucomannans and xylans and improved yields. For dissolving pulp grades, higher concentrations of base are used as xylan and glucomannans are undesirable.

After treatment with base, the pulp is drained, washed and subsequently bleached or otherwise treated by well-known processes to give a pulp of the desired properties. The water from the acid washings may be used to neutralize the liquid drained after the treatment with base. Evaporation of the neutral liquid gives a mixture of lignin with sodium or ammonium nitrates and nitrites. This mixture would be suitable for use as a fertilizer.

The temperature of the wash water is not an important consideration; about 50° C. to 75° C. is preferred for efficiency. Hotter temperatures permit some escape of nitric acid fumes.

The concentration of base depends on the desired end-product. Where a high yield (about 60% to 80%) is required, a 1% sodium hydroxide solution is sufficient. Somewhat higher concentrations (about 1% to 2%) are used for the lower yield levels, where some retention of glucomannans and xylans is desirable. Where retention of glucomannans and xylans is to be avoided, as in the production of dissolving pulps, still higher concentrations may be used.

Preferably, six parts by weight of base solution is used for each part of dry cellulosic material. Higher amounts of solution give excessive volumes of wash liquors while lower amounts yield a slurry which is too thick to be handled readily. However, higher or lower amounts are not to be excluded.

Turning now to a comparison of the process of the present invention with previous processes, several advantages are apparent. These include uniquely short pulping times and the ability to use atmospheric pressure and ambient temperatures. The more conventional cooking processes such as the kraft and sulfite processes, require pressurized reactors and temperatures in excess of 100° C. Even the closely related nitric acid cooking processes require higher temperatures by application of external heat or much longer times of contact, pressure or vacuum pre-impregnation steps, high nitric acid flow rates or multiple stage cooking. The present process avoids these costly requirements.

A serious drawback of the sulfite and kraft processes is their pollution of the atmosphere, or watercourses, or both. The use of the present process eliminates substantially all contamination of the environment.

Oxides of nitrogen have been used in diluted form in several previous processes. Because of the dilute state, longer times or higher temperatures and pressures were required. The avoidance of such process conditions constitutes a distinct advantage of the present process.

Oxides of nitrogen have been used to purify pulps subsequent to a fiberization or primary pulping stage. Such a treatment of fibers, which are already opened up, is actually a bleaching step and is outside the contemplation of the present invention. Central to the very efficient priparmy pulping process of the present invention is the discovery that gaseous $NO_2$ is capable of penetrating and reacting wth the raw lignocellulosic material more quickly than nitric acid or more dilute oxides of nitrogen at atmospheric pressure and ambient temperatures.

The water washing and alkaline treatment steps following the $NO_2$ primary pulping step of this invention can be conventional, as are those described above. Or, ammonia gas can be introduced to the drained and washed chips to accomplish the base treatment. This pulp is broken up after a short soak in 60° C. water. This method gives a pulp of at least equally good properties and has the added advantage of a reduction of the volumes of water which must be evaporated before recovery of lignin, ammonium nitrate, and ammonium nitrite.

A plant capable of using the present process could include conventional equipment (digestors, screens, refiners, etc.). An existing pulp or paper mill could, therefore, be converted to such use. However, the uniquely rapid reaction involved and the concomitant lack of need for pressurization and external heat sources make possible completely new concepts in pulping machinery, with large savings in equipment, steam, and time.

By way of illustration, a flow sheet for a plant producing wood pulp and fertilizer in accordance with the present invention is given in the attached figure. Wood chips, or other forms of cellulose such as straw or bagasse, are fed into a water-cooled, rotating reactor, either continuously or in batches. Gaseous $NO_2$ is passed through the chips continuously. Excess $NO_2$ is condensed, while by-product NO passes to an oxidizer where $NO_2$ is spontaneously regenerated by oxygen addition. The reoxidized $NO_2$ is returned to the reactor by way of the evaporator and make-up $NO_2$ is added from an external source or from the condensate. After the $NO_2$ treatment is complete, the chips are washed, treated with NaOH (or $NH_4OH$), refined to separate the fibers, and the slurry is thickened. In the finishing phase of the process, after washing and any necessary conventional after treatments, the pulp is dried by conventional means. The extract obtained on thickening the pulp may be evaporated and dialyzed to recover excess NaOH or $NH_4OH$ which is returned to the causticiser. The remaining liquid is acidified with the wash water, any precipitated lignin is removed and the solid lignin nitrate-nitrite mixture is obtained by evaporation of water. Excess $NO_2$ is returned to the evaporator.

The following examples are given as further illustrations of the present invention although it is not intended that they limit its scope in any way.

EXAMPLE I 200 g. of 1.5 x 0.75 x .02 inch poplar wafers which contained 41.7% moisture were placed in a 2 liter aspirator bottle. The bottle was placed in a 25° C. water bath and $NO_2$ gas passed in through the outlet near the bottom of the bottle for 30 minutes. The bottle was then purged briefly with air to remove $NO_2$ and the wafers were transferred to a Buchner funnel. After washing with water, the wafers were immersed in 8 parts of 3% NaOH solution at 90° C. for 45 minutes followed by 15 seconds high-speed stirring using a Waring Blendor. The yield of screened pulp from wood was 57%.

EXAMPLE II

The procedure in Example I was followed using spruce mill chips which contained 75% moisture. A 90 minute contact time with $NO_2$ gas was used. A 41% yield of screened pulp was obtained.

EXAMPLE III

The procedure in Example I was repeated using northern mixed hardwood mill chips which contained 41.8% moisture. A 90 minute contact time with $NO_2$ was used. The yield of screened pulp was 30.3%.

EXAMPLE IV 300 g. of the northern hardwood mill chips were placed in a 12 liter flask. The flask was placed on its side and rolled under a 23° C. spray of water. $NO_2$ gas was passed into the flask through a stainless steel tube for 10 minutes and then the flask was purged with air. The chips were washed five times with 60° C. water and mixed with 6 parts of 1% NaOH solution at 90° C. for 45 minutes. After disc refining, a 77% yield of screened pulp was obtained.

EXAMPLE V

The procedure of Example IV was repeated with 22 minutes contact time with $NO_2$ gas. After washing with water, the chips were treated with six parts of 1% $NH_4OH$ solution for 60 minutes at 90° C. After refining, a 65.7% yield of screened pulp was obtained.

EXAMPLE VI

The procedure of Example IV was repeated to the end of the water washing stage, with 30 minutes contact time with $NO_2$ gas. After washing the chips were returned to the flask and $NH_3$ gas was run in for 15 minutes. Room temperature ammonia was used. The chips were soaked in water at 60° C. for 5 minutes and then refined. A 70% yield of screened pulp was obtained.

What is claimed is:

1. In a primary pulping process, the step of contacting raw ligno-cellulosic material with essentially pure nitrogen dioxide gas at atmospheric pressure and ambient temperature to produce cellulosic pulp.

2. The process of claim 1 wherein the contacting is accompanied by cooling.

3. In a primary pulping process, the steps of: contacting raw ligno-cellulosic material with essentially pure nitrogen dioxide gas at atmospheric pressure and ambient temperature to produce cellulosic pulp; washing the cellulosic pulp with water; and, neutralizing the washed cellulosic pulp with alkali.

4. The process of claim 3 wherein the starting temperature is not less than about 23° C. and the final temperature is not more than about 35° C.

5. The process of claim 3 wherein the starting temperature is not less than about 23° C. and the final temperature is not more than about 80° C.

6. The process of claim 3 wherein the alkali is sodium hydroxide.

7. The process of claim 3 wherein the alkali is ammonium hydroxide.

8. The process of claim 3 wherein the alkali is ammonia gas.

9. In a primary pulping process, the steps of continuously contacting raw ligno-cellulosic material with essentially pure nitrogen dioxide gas in a reactor at atmospheric pressure and ambient temperature to produce a mixture of cellulosic pulp and lignin, excess nitrogen dioxide, and nitric oxide; condensing the excess nitrogen dioxide; oxidizing the nitric oxide; recycling the condensed excess nitrogen dioxide to an evaporator, from which the nitrogen dioxide in gaseous form is passed to the reactor;

recycling the oxidized nitric oxide to the reactor; washing the mixture of cellulosic pulp and lignin with water to produce a washed mixture of cellulosic pulp and lignin and an aqueous mixture of nitrous and nitric acids; neutralizing the washed mixture of cellulosic pulp and lignin with alkali to produce neutralized cellulosic pulp and a lignin nitrate-nitrite mixture; refining the neutralized cellulosic pulp and the lignin nitrate-nitrite mixture to produce a slurry; extracting the slurry to produce slurried cellulosic pulp, recover alkali, and remove the lignin nitrate-nitrite mixture; recycling the extracted alkali for re-use in further neutralization; and finishing the slurried cellulosic pulp.

References Cited
UNITED STATES PATENTS

| | | | |
|---|---|---|---|
| 1,736,080 | 11/1929 | Heimann et al. | 162—81 |
| 2,571,993 | 10/1951 | Desorbay | 162—81 |
| 2,733,992 | 2/1956 | Reyerson | 162—63 |
| 3,130,115 | 4/1964 | Thomsen | 162—81 |

S. LEON BASHORE, Primary Examiner

T. G. SCAVONE, Assistant Examiner

U.S. Cl. X.R.

162—17, 45, 60, 63, 81, 90; 260—124